(12) United States Patent
Chen

(10) Patent No.: US 7,492,085 B2
(45) Date of Patent: Feb. 17, 2009

(54) COLD CATHODE FLUORESCENT LAMP WITH MIXING GAS FILLED THEREIN AND BACKLIGHT MODULE USING SAME

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 237 days.

(21) Appl. No.: 11/473,989

(22) Filed: Jun. 23, 2006

(65) Prior Publication Data

US 2007/0114908 A1 May 24, 2007

(30) Foreign Application Priority Data

Nov. 18, 2005 (TW) .................................. 94140611

(51) Int. Cl.
*H01J 63/04* (2006.01)
(52) U.S. Cl. ..................... 313/493; 313/623
(58) Field of Classification Search ................. 313/493, 313/491, 634, 623
See application file for complete search history.

(56) References Cited

U.S. PATENT DOCUMENTS

| 5,572,088 | A | 11/1996 | Aizawa et al. |
| 6,268,694 | B1 | 7/2001 | Fujimoto |
| 6,652,967 | B2 * | 11/2003 | Yadav et al. ............. 428/403 |
| 6,921,730 | B2 * | 7/2005 | Atagi et al. ............. 501/64 |
| 2002/0140351 | A1 * | 10/2002 | Yamashita et al. ...... 313/623 |

* cited by examiner

Primary Examiner—Joseph L Williams
(74) Attorney, Agent, or Firm—Andrew C. Cheng

(57) ABSTRACT

A cold cathode fluorescent lamp (30) includes a working gas (32), a transparent tube (34), a cold cathode (36), and an anode (38). The transparent tube receives the working gas therein, and the transparent tube has an inner surface (340). A coating (342) is formed on the inner surface of the transparent tube. The cold cathode and the anode are disposed at two ends of the transparent tube separately. A backlight module (50) includes a light guide plate (52) having a light incident surface (520), and the cold cathode fluorescent lamp as described above disposed adjacent the light incident surface.

20 Claims, 3 Drawing Sheets

COLD CATHODE FLUORESCENT LAMP WITH MIXING GAS FILLED THEREIN AND BACKLIGHT MODULE USING SAME

TECHNICAL FIELD

The present invention relates to light source devices for use in, e.g., liquid crystal displays (LCDs), particularly, to a cold cathode fluorescent lamp (CCFL) and a backlight module using the same.

BACKGROUND

A CCFL is a kind of gas-discharge light source, which is widely used as light source for light source device such as backlight module used in thin film transistor liquid crystal display (TFT-LCD), LCD-TV, notebook, or portable digital video disc (DVD).

Referring to FIG. 3, generally a CCFL 10 includes a transparent tube 12, a cold cathode 14, an anode 16, and a fluorescent layer 18. The fluorescent layer 18 is formed on an inner surface of the transparent tube 12. The cold cathode 14 and the anode 16 are respectively disposed at two ends of the transparent tube 12 and are electrically connected to an exterior power source. The transparent tube 12 is filled with mercury vapor and an inert gas.

When the power source supplies a current to the cold cathode and the anode, an electric field therebetween is produced and electrons are emitted from the cold cathode. The electrons are accelerated by the electric field and then collide with gaseous molecules of the mercury vapor and the inert gas. This causes excitation of the mercury vapor and radiation of ultraviolet rays. The ultraviolet rays irradiate a fluorescent material of the fluorescent layer, whereby a part of the ultraviolet rays are converted into visible lights.

The CCFLs are more efficiently than light emitting diodes (LEDs) when they are used in the backlight modules. However, the brightness and the efficiency of CCFLs are not high enough.

What is needed, therefore, is a cold cathode fluorescent lamp with high efficiency and high brightness.

SUMMARY

A cold cathode fluorescent lamp, according to one embodiment, includes a working gas, a transparent tube, a cold cathode, and an anode. The transparent tube receives the working gas therein, and the transparent tube has an inner surface. A coating is formed on the inner surface of the transparent tube. The cold cathode and the anode are disposed separately at either end of the transparent tube. According to another embodiment, a backlight module includes a light guide plate having a light incident surface, and a cold cathode fluorescent lamp as described above disposed adjacent the light incident surface.

BRIEF DESCRIPTION OF THE DRAWINGS

Many aspects of the present cold cathode fluorescent lamp and backlight module can be better understood with reference to the following drawings. The components in the drawings are not necessarily drawn to scale, the emphasis instead being placed upon clearly illustrating the principles of the present cold cathode fluorescent lamp and backlight module. Moreover, in the drawings, like reference numerals designate corresponding parts throughout the several views.

DETAILED DESCRIPTION OF PREFERRED EMBODIMENTS

Reference will now be made to the drawings to describe in detail the preferred embodiments of the present cold cathode fluorescent lamp and the backlight module.

Figure 1:
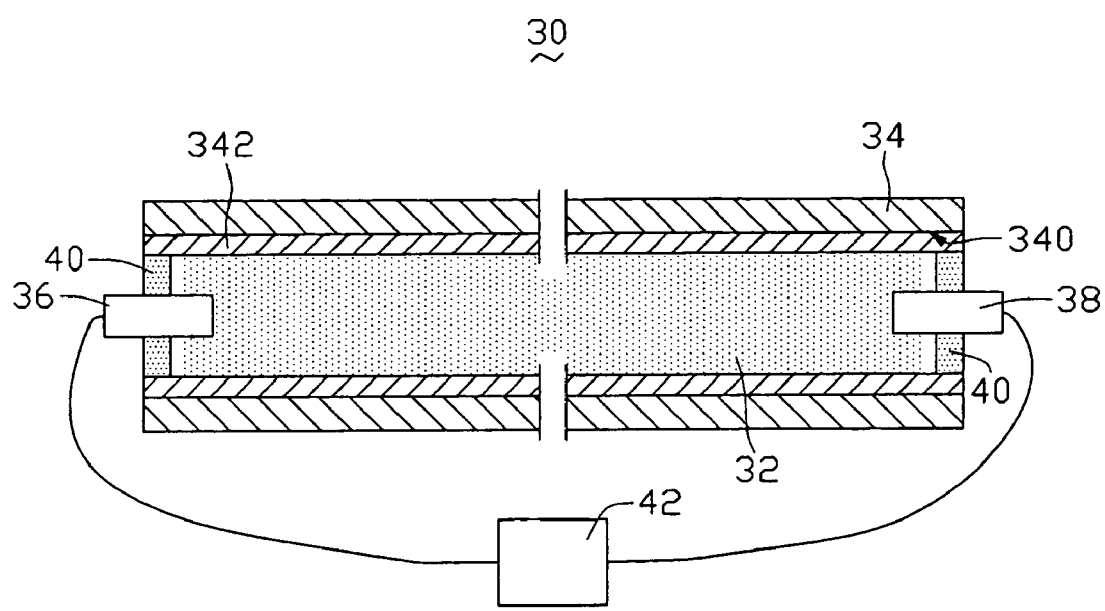
FIG. 1 is a schematic, cross-sectional view of a CCFL in accordance with a preferred embodiment.

Referring to FIG. 1, a cold cathode fluorescent lamp 30 includes a working gas 32, a transparent tube 34, a cold cathode 36, and an anode 38. The transparent tube 34 accommodates the working gas 32 therein and has an inner surface 340. A coating 342 is formed on the inner surface 340 of the transparent tube 34. The cold cathode 36 is disposed at one end of the transparent tube 34, and the anode 38 is disposed at the other end of the transparent tube 34. The cold cathode 36 and the anode 38 are sealed separately within a respective one of the two sealing layers 40 hermetically, and connected with a same fluorescent starter 42 electrically.

The transparent tube 34, according to the illustrated embodiment, is in a form of cylinder. A material of the transparent tube 34 may be made of glass or transparent resin material. Preferably, the transparent tube 34 can contain some nano-sized silicon dioxide particles, which are configured for increasing the resistance to elevated temperatures of the transparent tube 34.

The working gas 32 accommodated in the transparent tube 34 is a mixture of argon (Ar) and mercury (Hg) gas. Preferably, the working gas may further include xenon (Xe), krypton (Kr), and a mixture thereof. Xenon and krypton have higher atomic mass than argon. Thus, mercury gas particles are easier to activate and will irradiate ultraviolet rays when the xenon and/or krypton collide with them.

The coating 342 is fanned on the inner surface 340 of the transparent tuba 34. The coating 342 is advantageously made of such nano-sized particles as Eu—$ZnSiO_x$, Er—$YBO_3$, Eu—$GdBO_3$, $ErO_x$, $TbO_x$, $EuO_x$, and any combination thereof. In a preferable embodiment, the coating 342 is made of Eu—$Zn_2SiO_4$, Er—$YBO_3$, Eu—$GdBO_3$, $Er_2O_3$, $Tb_2O_3$, $Eu_2O_3$ and any combination thereof. The coating 342 is in a form of a layer having a thickness in the range from about 500 nm to about 50 µm, and preferably from about 1 µm to 10 µm. The average grain size of the particles is in the range from about 10 nm to about 500 nm, and preferably from about 20 nm to 200 nm.

The cold cathode 36 and the anode 38, according to the illustrated embodiment, are disposed at two ends of the transparent tube 34. Half of the cold cathode 36 and the anode 38 are sealed in the transparent tube 34 with two sealing layers 40 separately. The other halves of the cold cathode 36 and anode 38 are exposed outside and connected with the fluorescent starter 42 electrically. A material of the cold cathode 36 and the anode 38 may be nickel (Ni) or tungsten (W).

The two sealing layers 40 are advantageously made of Kovar alloy (Westinghouse Electric Corporation, Monroeville, Pa.). Kovar alloy is an alloy of iron, nickel and cobalt, which has the same thermal expansion as glass and silicon. Therefore, the sealing layers 40 has similar coefficient of thermal expansion with materials of the cold cathode 36 and the anode 38. As a result, the tightness of the transparent tube 34 is increased.

The fluorescent starter 42, according to the illustrated embodiment, is a piezoelectric fluorescent starter. The piezoelectric fluorescent starter has high efficiency, small size and low weight, which satisfy the requirements for backlight module of TFT-LCD, especially in portable devices.

In operation, the cold cathode 36 and the anode 38 are supplied with a voltage by an external power source (not shown). An electric field is established between the cold cathode 36 and the anode 38. Electrons are emitted from the cold cathode 36 and accelerated by the electric field, and then collide with gaseous molecules of the working gas 32. Because xenon or krypton contained in the working gas 32 has higher atomic mass than argon, the gaseous molecules of mercury are easier to activate and irradiate ultraviolet rays when the molecules of xenon or krypton collide with them. Then, the ultraviolet rays irradiate the nano-sized particles of the coating 342. Because the nano-sized particles have larger contact areas than traditional fluorescent particles, the chances of collision between the ultraviolet rays and the nano-sized particles are increased. As a result, the brightness and the efficiency of visible light converted from the ultraviolet rays are enhanced.

It is to be noted that although a tubular CCFL is used as an exemplary illustration of the embodiment, different shaped CCFLs, such as U shaped, L shaped, W shaped, etc. can be selected as an alternative according to practical application within the spirit of the present invention.

Figure 2:
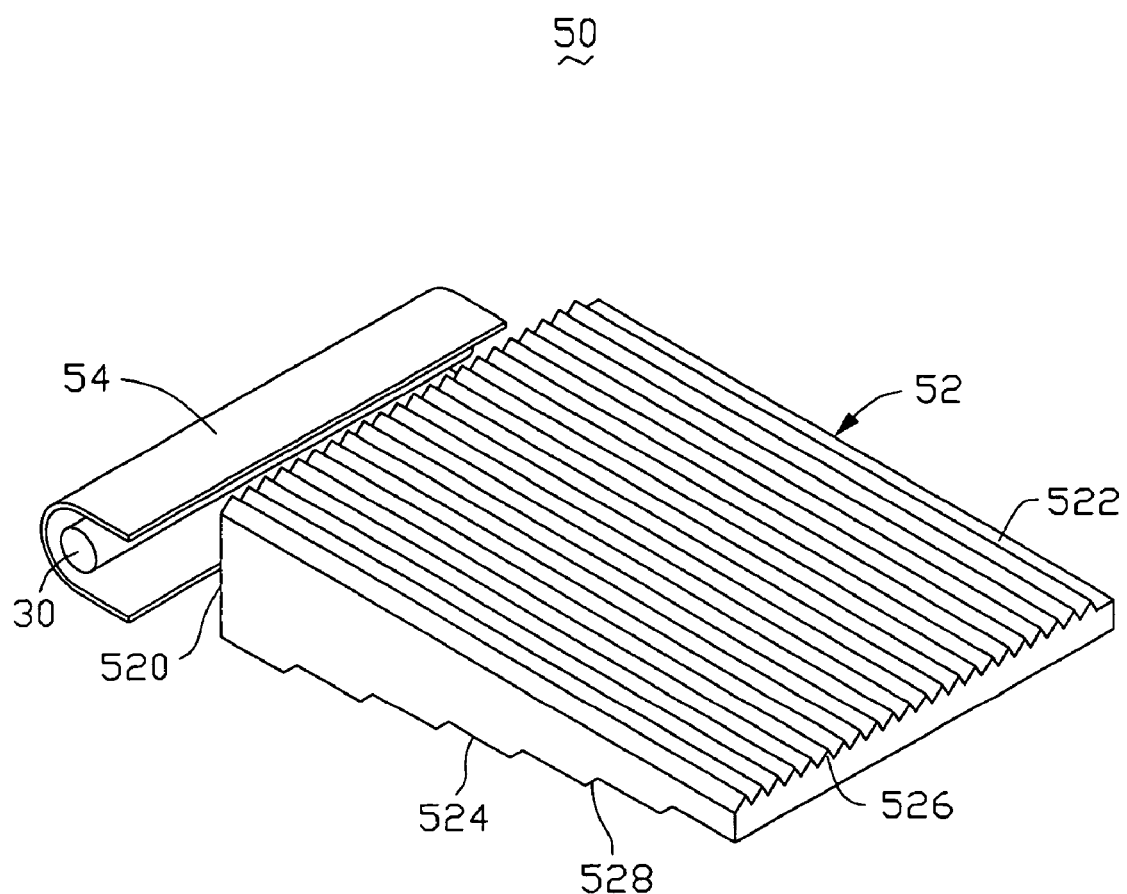
FIG. 2 is a schematic, isometric view of a backlight module in accordance with another embodiment.
Figure 3:
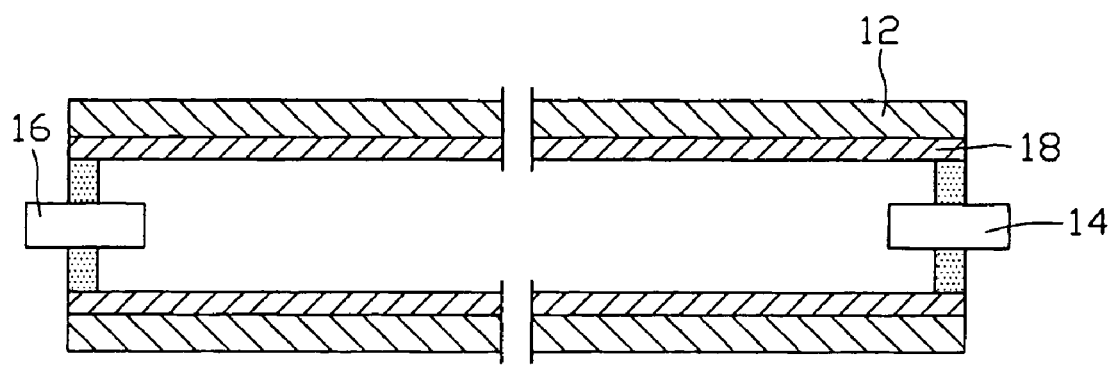
FIG. 3 is a schematic, cross-sectional view of a conventional CCFL.

Referring to FIG. 1 and FIG. 2, a backlight module 50 using the CCFL 30, In accordance with a first preferred embodiment, is shown. The backlight module 50 Includes a light guide plate 52, and the CCFL 30. The light guide plate 52 includes a light incident surface 520, a light-emitting surface 522 adjacent to the light incident surface 520, and a light reflecting surface 524 opposite to the light emitting surface 522. The CCFL 30 is disposed adjacent to the light incident surface 520 of the light guide plate 52. The backlight module 50 can further include a reflector 54 that Is placed partly around the CCFL 30. The reflector 54 is configured for reflecting light back into the light guide plate 52. The shape of the light guide plate 52 may be flat or wedge-like. In the illustrated embodiment, the shape of the light guide plate 52 is wedge-like.

Furthermore, first grooves 526 are formed on the emitting surface 522 extending out at regular intervals in a direction parallel to an X-axis. A second grooves 528 are formed on the reflecting surface 524 at regular intervals in a direction parallel to a Y-axis. The first grooves 526 and the second grooves 528 are configured for controlling direction of light to enhance the light emitting efficiency. The numbers and shapes of the grooves 526, 528 are not limited in the embodiment, although the V-shaped grooves are exemplarily illustrated, and the backlight module 50 can further include other components that are not described in the embodiment, such as a reflection sheet and etc.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A cold cathode fluorescent lamp, comprising:
a transparent tube having an inner surface;
a working gas filled in the transparent tube, the working gas comprising argon gas, mercury gas, and at least one of xenon gas and krypton gas;
a coating formed on the inner surface of the transparent tube, the coating formed from a plurality of nano-sized particles comprised of a material selected from the group consisting of Eu—$Zn_2SiO_4$, Er—$YBO_3$, Eu—$GdBO_3$, $Er_2O_3$, $Tb_2O_3$, $Eu_2O_3$, and any combination thereof;
a cold cathode disposed at one end of the transparent tube; and
an anode disposed at the other end of the transparent tube.

2. The cold cathode fluorescent lamp as described in claim 1, wherein a material of the transparent tube can be selected from the group consisting of glass and transparent resin material.

3. The cold cathode fluorescent lamp as described in claim 1, wherein a material of the transparent tube contains nano-sized particles of silicon dioxide therein.

4. The cold cathode fluorescent lamp as described in claim 1, wherein the coating has a thickness in the range of about 500 nm to about 50 µm.

5. The cold cathode fluorescent lamp as described in claim 1, wherein the nano-sized particles have an average grain size in the range from about 10 nm to about 500 nm.

6. The cold cathode fluorescent lamp as described in claim 1, further comprising two sealing layers configured for sealing the cold cathode and the anode in the transparent tube at the two ends thereof.

7. The cold cathode fluorescent lamp as described in claim 6, wherein a material of the sealing layers is Kovar alloy.

8. The cold cathode fluorescent lamp as described in claim 1, further comprising a fluorescent starter electrically connecting the cold cathode and the anode.

9. The cold cathode fluorescent lamp as described in claim 8, wherein the fluorescent starter comprises a piezoelectric film.

10. A backlight module, comprising:
a light guide plate having a light incident surface; and
a cold cathode fluorescent lamp disposed adjacent the light incident surface;
the cold cathode fluorescent lamp comprising:
a transparent tube having an inner surface;
a working gas filled in the transparent tube, the working gas comprising argon gas, mercury gas, and at least one of xenon gas and krypton gas;
a coating formed on the inner surface of the transparent tube, the coating formed from a plurality of nano-sized particles comprised of a material selected from the group consisting of Eu—$Zn_2SiO_4$, Er—$YBO_3$, Eu—$GdBO_3$, $Er_2O_3$, $Tb_2O_3$, $Eu_2O_3$ and any combination thereof;
a cold cathode disposed at one end of the transparent tube; and
an anode disposed at the other end of the transparent tube.

11. The backlight module as described in claim 10, wherein the cold cathode fluorescent lamp further comprises two sealing layers configured for sealing the cold cathode and the anode in the transparent tube at two ends thereof.

12. The backlight module as described in claim 11, wherein a material of the sealing layers is Kovar alloy.

13. The backlight module as described in claim 10, wherein the cold cathode fluorescent lamp further comprises a fluorescent starter connecting the cold cathode and the anode electrically.

14. The backlight module as described in claim 13, wherein the fluorescent starter comprises a piezoelectric film.

15. A cold cathode fluorescent lamp, comprising:

a transparent tube having an inner surface;

a working gas filled in the transparent tube;

a coating formed on the inner surface of the transparent tube, the coating formed from a plurality of nano-sized particles comprised of a material selected from the group consisting of Eu—$Zn_2SiO_4$, Er—$YBO_3$, Eu—$GdBO_3$, $Er_2O_3$, $Tb_2O_3$, $Eu_2O_3$, and any combination thereof;

a cold cathode disposed at one end of the transparent tube;

an anode disposed at the other end of the transparent tube; and a fluorescent starter electrically connected with the cold cathode and the anode, the fluorescent starter comprising a piezoelectric film.

16. The cold cathode fluorescent lamp as described in claim 15, wherein the working gas comprises argon gas, mercury gas, and at least one of xenon gas and krypton gas.

17. The cold cathode fluorescent lamp as described in claim 16, wherein a material of the transparent tube contains nano-sized particles of silicon dioxide therein.

18. The cold cathode fluorescent lamp as described in claim 17, wherein the nano-sized particles have an average grain size in the range from about 10 nm to about 500 nm.

19. The cold cathode fluorescent lamp as described in claim 16, further comprising two sealing layers configured for sealing the cold cathode and the anode in the transparent tube at the two ends thereof.

20. The cold cathode fluorescent lamp as described in claim 19, wherein a material of the sealing layers is Kovar alloy.

* * * * *